Figure 1:
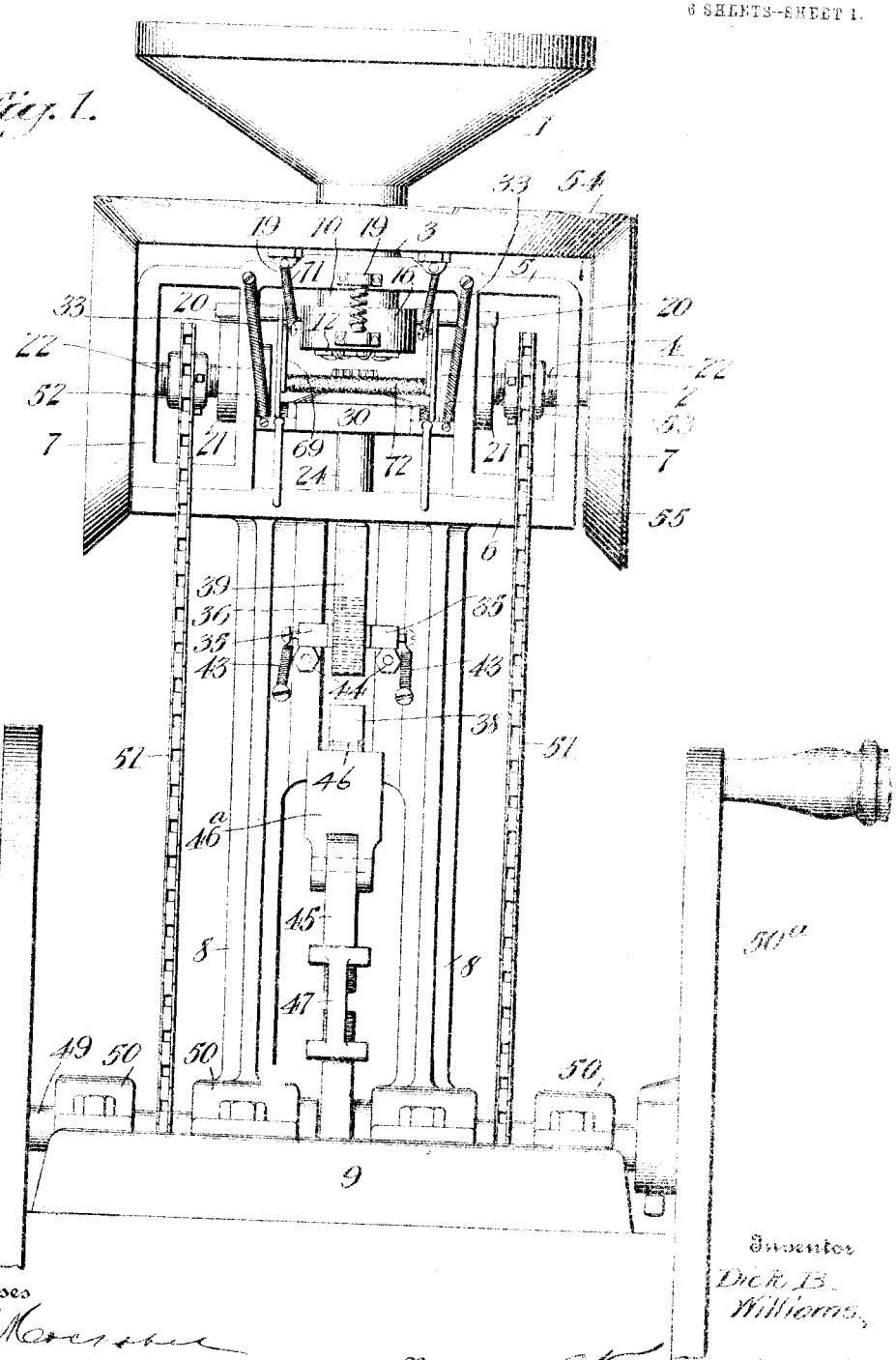
Figure 2:
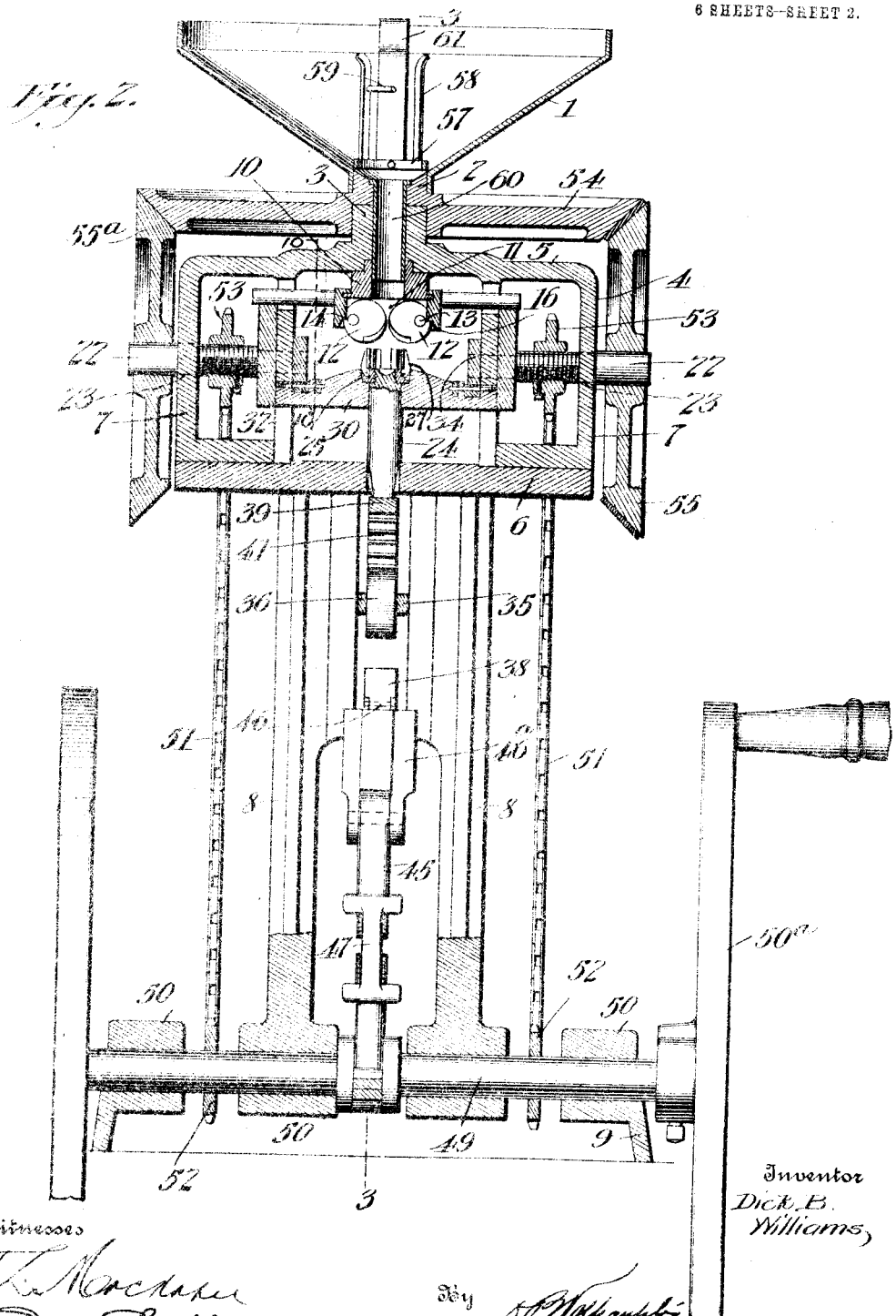
Figure 3:
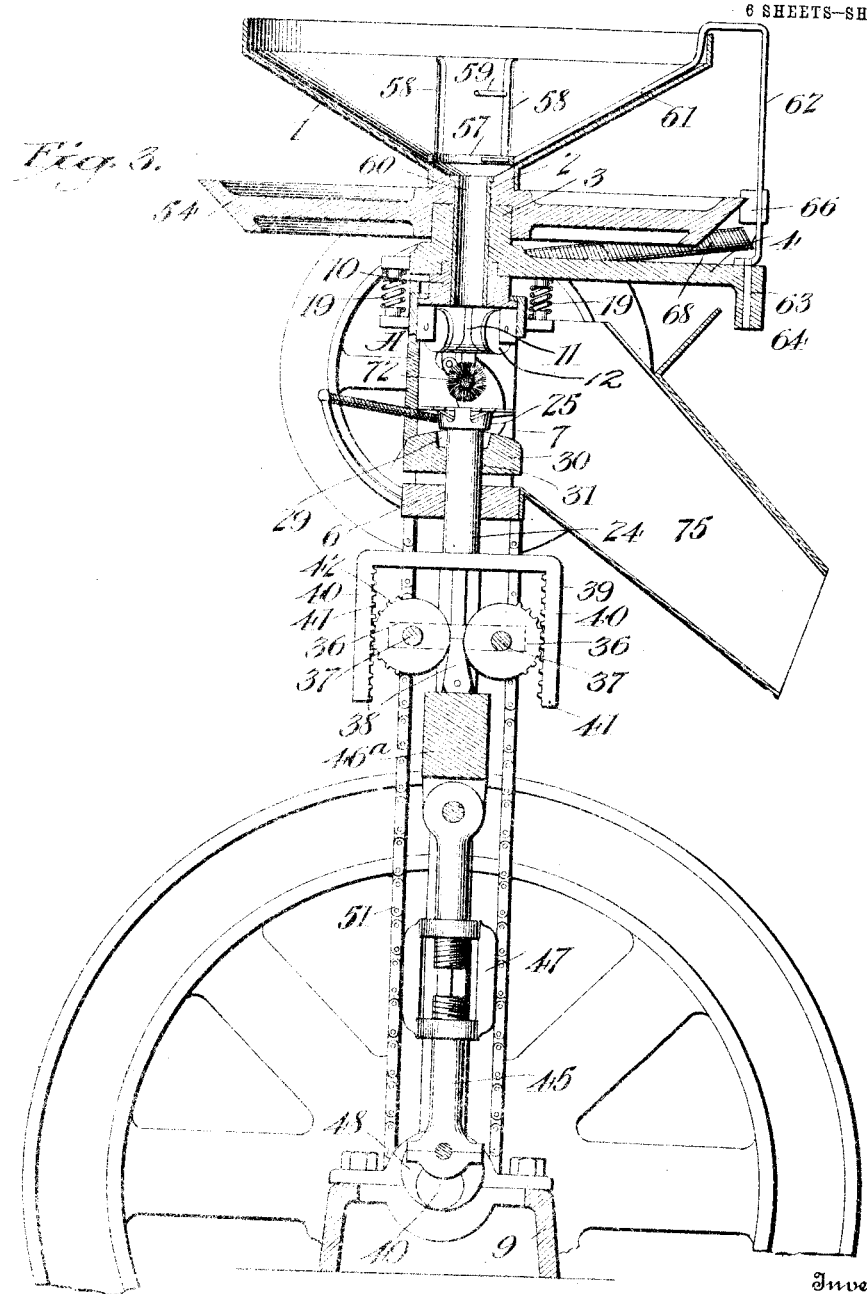

D. B. WILLIAMS.
NUT CRACKING MACHINE.
APPLICATION FILED MAY 9, 1914.

1,132,817.

Patented Mar. 23, 1915.
6 SHEETS—SHEET 1.

Witnesses

Inventor
Dick B. Williams
By
Attorney

D. B. WILLIAMS.
NUT CRACKING MACHINE.
APPLICATION FILED MAY 9, 1914.

1,132,817.

Patented Mar. 23, 1915.
6 SHEETS—SHEET 4.

Inventor
Dick B. Williams

Witnesses

D. B. WILLIAMS.
NUT CRACKING MACHINE.
APPLICATION FILED MAY 9, 1914.
1,132,817.
Patented Mar. 23, 1915.
6 SHEETS—SHEET 5.
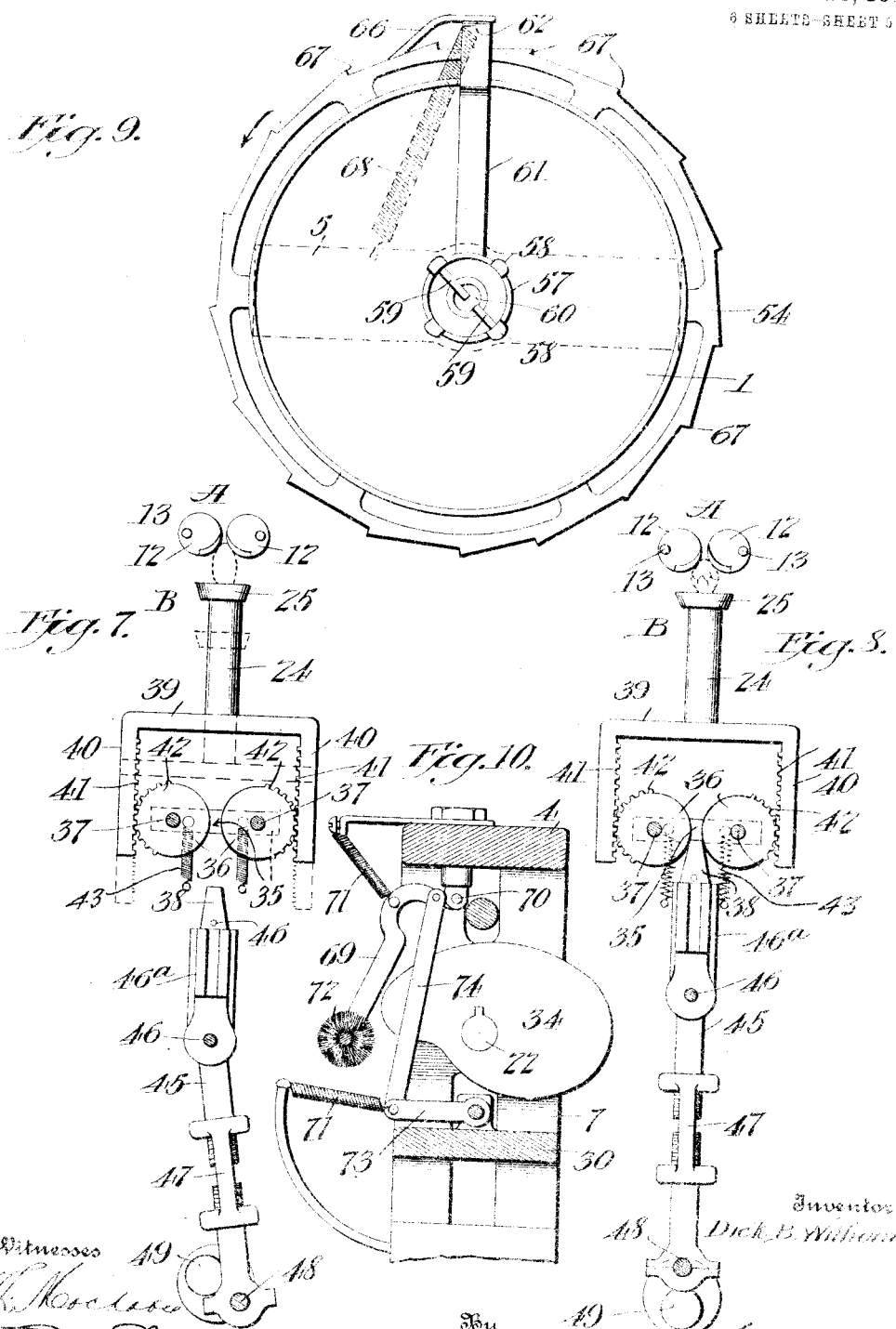

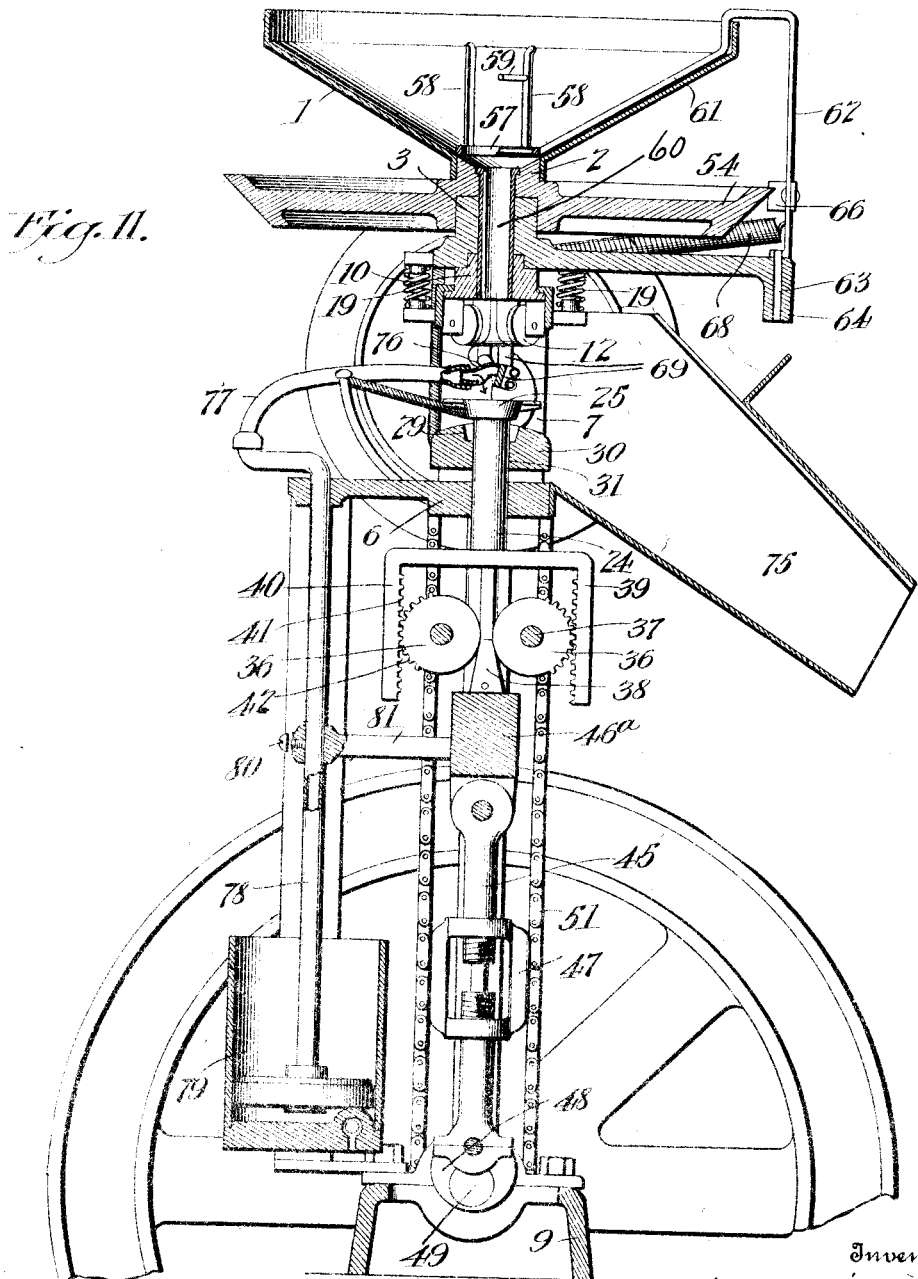

UNITED STATES PATENT OFFICE.

DICK B. WILLIAMS, OF NEW ORLEANS, LOUISIANA, ASSIGNOR, BY DIRECT AND MESNE ASSIGNMENTS, TO LOUISIANA NUT AND MACHINE COMPANY, OF NEW ORLEANS, LOUISIANA, A CORPORATION OF LOUISIANA.

NUT-CRACKING MACHINE.

1,132,817.   Specification of Letters Patent.   Patented Mar. 23, 1915.

Application filed May 9, 1914. Serial No. 837,431.

*To all whom it may concern:*

Be it known that I, DICK B. WILLIAMS, a citizen of the United States, residing at New Orleans, in the parish of Orleans and State of Louisiana, have invented certain new and useful Improvements in Nut-Cracking Machines, of which the following is a specification.

This invention relates to nut cracking machinery particularly of the type designed for cracking the shells of elongated nuts, such as pecans.

To this end, the invention has for its primary object the provision of a machine possessing special utility in its adaptation for cracking pecans, and in such a manner as not to injure the kernel or meat and to permit the latter being freed from the shell in a perfect or substantially perfect condition, thereby greatly enhancing the commerceability and value thereof.

In carrying out this general object of a machine capable of practical commercial use in cracking the shells of pecans without substantial injury to the kernel or meat thereof, the present invention has specially in view the utilization of novel instrumentalities so constructed and arranged as to permit a compression force alone, or "squeeze," to be employed as the means for properly and effectually cracking the shells of the nuts in the desired manner. In this particular the invention distinguishes from known types of pecan cracking machines which use auxiliary or supplemental devices to assist the action of the pressure means, that is to say auxiliary or supplemental devices which puncture or cut end portions of the shell to initiate cracks which are fully developed by the operation of other means with the result that a perfect cracking of the shell only occasionally occurs and without any reliability. At the same time, mechanisms of this character involving the use of shell puncturing or cutting devices cause the breaking down of the ends of the nuts and a consequent injury to the kernel and an impairment of its commercial value, whereas a distinctive feature of the present machine, described and claimed herein, is that of providing a means for so positioning and holding the pecans that the mere application of a compression movement or squeeze, from the end for a limited distance, serves to "burst" the shell about its middle without breaking the ends thereof, with the result that substantially intact end caps of the shell remain at the ends of the nut while a great number of longitudinally extending cracks are opened from the middle toward the ends. Thus, the shell may be and is cracked by the improved machine in such a manner as to permit the removal of the kernel or meat in uninjured halves.

In connection with the foregoing, another important and practical feature of the improved machine is that of providing positive and reliable means for obtaining the same degree or amplitude of compression movement regardless of the length of the nut that is admitted to the machine. One of the greatest obstacles to a successful and commercial pecan cracking machine is that heretofore it has been impossible to apply the same pressure or stroke to nuts of varying length, and consequently satisfactory results have only been attained where carefully graded nuts are passed through the machine, nuts graded not only as to diameter but also as to length. It is, therefore, one of the principal objects of the present invention to provide a nut cracking machine which is adaptable to nuts of varying length without interfering in the least with the action of the means employed for always subjecting every nut to the same extent of compression movement with the result of securing the most satisfactory cracking effects, and also obviating the great labor and expense which is otherwise necessary to gage the nuts to uniform length before they are introduced into the machine.

A further general object of the invention is to provide a nut cracking machine including a minimum number of parts, while at the same time not only possessing the functional characteristics referred to, but also such adjustments as will enable it to meet the requirements of all commercial grades of nuts that are carried through nut cracking machines.

Another object of the invention is to associate with the cracking mechanism simple and effective means for rapidly ejecting the cracked nut and automatically cleaning away obstructing shell particles.

With these and other objects in view which will be readily apparent to those pression movement in order to secure the effectual and perfect cracking of the shell as hereinbefore indicated. That is to say, the pecan or similarly shaped nut, is designed to be automatically positioned and supported between the two compression members A and B and then subjected to the fracturing force of a slight compression movement imparted to one of said members, followed by the quick automatic ejection of the cracked nut from the machine and the clearing away of shell particles from the seating surfaces of the compression members.

Referring particularly to the construction and relation of the various elements embodied in the nut-cracking unit, it is to be observed by reference to the drawings that the compression member A is of peculiar design and performs a dual function. This compression member (A) has a fixed location in the machine and forms one of the operating parts of the nut feeding mechanism, which mechanism includes a flaring revoluble supply hopper 1 fitted to and carried by a rotary supporting sleeve 2 loosely journaled on a central bearing projection or boss 3 arranged centrally at the upper side of the machine frame 4. The latter may conveniently be of an open rectangular form having the upper and lower frame bars 5 and 6 respectively, and the end pieces 7 connecting the ends of said bars to complete a rigid framework, but of course the structural form of the frame is of minor importance and not material to the invention, though it has been found preferable to make it of the general form indicated and support the same in an elevated position upon the legs or standards 8 arising from a suitable frame base or bed 9.

The central bearing projection or boss 3 has its bore in communication with the opening through the hopper supporting sleeve 2, and also with the opening through a stationary feeding head 10 supported from the central portion of the upper frame bar 5. The stationary feeding head 10 essentially consists of a cylindrical block cut away at its lower end to provide a delivery mouth 11 within which is mounted the upper compression member A. This upper compression member may be termed an automatic segregator because it performs two functions, namely that of a segregating gate for permitting only one nut at a time to drop into the cracking zone, and as a stationary anvil or abutment within and against which the upper end of the nut is seated and held while subjected to the endwise compressing force. In its structural aspect, the cut-off anvil or compressing member A consists of a circular group of radially arranged abutment disks 12 which are eccentrically pivoted on supporting pivot pins 13 fitted in the cut away portion of the feeding head 10, and each of the said disks 12 is provided upon its outer edge portion with a catch shoulder 14 adapted to be engaged by an internal bearing shoulder 15 on a vertically reciprocating closing device 16. The said closing device 16 is preferably in the form of a collar or ring which slidably embraces the cylindrical feeding head 10, and is prevented from displacement by means of the internal flange 17 at the upper edge of the collar which overlies an external stop shoulder 18 formed on the feeding head 10. As is from this structural detail, the reciprocating collar 16 is held normally depressed by means of suitably arranged depression springs 19, and is provided with oppositely extending operating arms 20 adapted to be engaged by the peripheries of coöperating lifting cams 21 mounted on and carried by the oppositely located jack shafts or journaled in suitable bearings 23 arranged within and on the frame 4 respectively at opposite sides of the transverse vertical center of the machine. These cams are so designed and arranged that, at the proper time, they will engage and lift the operating arms 20 with the result of lifting the closing device or collar 16 from engagement with the disks 12, so that the latter may automatically swing downward upon their eccentric pivots, thereby opening up a space sufficiently large within the circle of said disks to admit of the passage of one pecan from the feeding head 10 down onto the lower compression member B.

Figure 5:
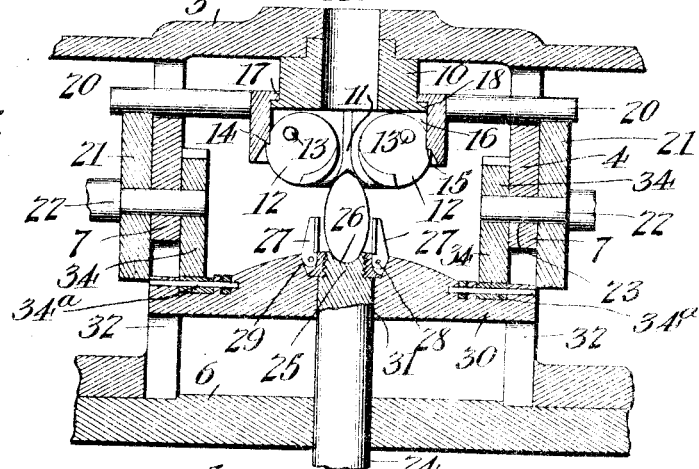
Figure 6:
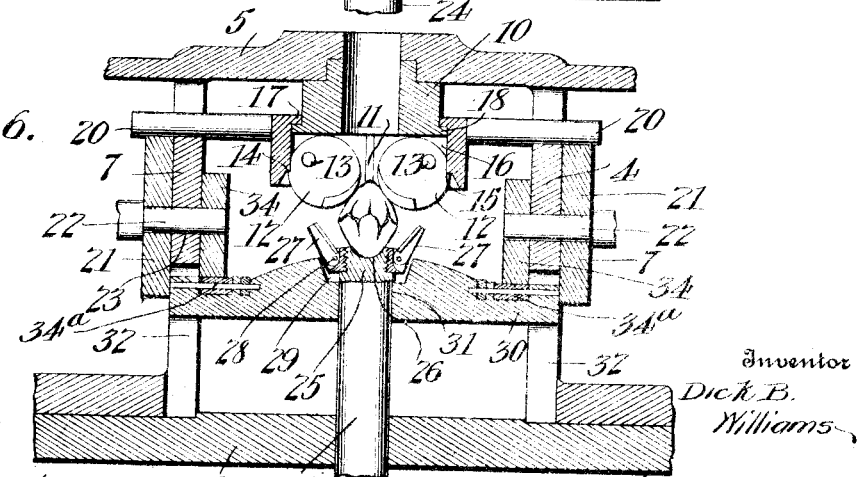

The lower compression member B preferably consists of a plunger stem 24 and a supporting head 25 carried at its upper end, which head is preferably adjustably fitted to the stem 24 as by the threads shown in Figs. 5 and 6, so that a definite adjustment is provided (if so needed) to more accurately set the said head as for for different variations in length of different grades of pecans being handled by the machine, although it will be understood that this is not a necessary feature of the machine. The supporting head 25 and its stem 24 constitute what may be termed a self-adjusting positioning and supporting anvil opposing the automatic cut out anvil above described, and in order to provide for the proper seating and support of the nut, the head 25 is formed at its upper side with a depressed seat or pocket 26 for the nut end and carries a nut centering holder to prevent accidental tilting of the nut out of position while the two anvils are being relatively adjusted prior to the compression movement. Various forms of nut centering holders, for the above purpose, may be employed, but a simple and practical construction consists of a holder comprising a plurality of upwardly disposed retaining arms 27 arranged in a circular group and having a pivotal support at their lower ends, as at 28, on the anvil or head 25. These arms 27 also have a movement into and out of a guiding seat 29 formed in the upper side of a vertically movable anvil carrier 30 arranged within the lower part of the frame 4, and also having a guide opening 31 through which the plunger stem 24 extends and reciprocates. It will thus be seen that the positioning and supporting anvil 25 has a vertical movement independent of the anvil carrier 30, and this movement is provided not only to permit the final compression movement or impulse to be independently imparted to the said anvil, but also for the purpose of automatically closing and opening the centering holder 27—27 respectively as the pecan is to be centered and positioned for the compression movement and then freed so that the cracked pecan may be ejected from the machine.

The movement of the positioning and supporting anvil 25 which carries the pecan upward into seating engagement within and against the group of abutment disks 12 is provided for through the anvil carrier 30. For this purpose the said carrier 30 is slidably guided at its ends as at 32 within the machine frame and is normally retracted in an upward direction by lifting springs 33 whose tension is sufficiently strong to lift the carrier 30 and the anvil 25 quite independently of the compensating compression device which gives the compression impulse or movement to the anvil or head 25. A movement of the carrier in the opposite direction, so as to lower the head 25 when a nut is first deposited thereon, may be conveniently accomplished by means of depressing cams 34 mounted on the inner ends of the jack shaft 22 and adapted to have a bearing engagement at 34ᵃ on the upper side of the end portion of the carrier, as plainly shown in the drawings.

As already indicated, an important and essential feature of this invention is a compensating compression device which provides means for imparting to the movable anvil 25, a constant compression movement as distinguished from a variable movement or stroke, as well as from a "hammer blow", such a blow being delivered to the nut by some machines with invariable injury to the kernel. This constant compression movement when once set is of the same degree or extent for all lengths of nuts being handled, and the compensating compression device which gives this movement or impulse is made up of three principal elements, namely a variably-movable element which is the anvil plunger 24, a compensating clutch, and an impulse element, said compensating clutch, and impulse element being entirely disconnected except on the compression movement for cracking the nut. The compensating clutch may be constructed in different ways, but for illustrative purposes it is shown in the drawings as essentially consisting of a vertically movable bearing frame 35, a pair of revoluble clutching disks 36, each having a concentric pivotal mounting 37 in the said frame, and a beveled or wedge-shaped locking detent 38 adapted to lock and unlock the said disks.

The revolubly mounted disks 36 of the compensating clutch are arranged in the same transverse plane, edge to edge, but with their peripheries slightly separated to leave a sufficient interval within which the detent 38 passes for wedging or frictional engagement with the disks when the clutch is "engaged". A movable coupling connection is maintained between the disk member of the clutch and the variably movable element or anvil 25, and this is provided for by having the anvil plunger 24 supporting or carrying a coupling yoke 39, the side arms 40 of which are formed with rack portions 41 engaging toothed sections 42 on the outer edge portions of the clutching disk 36. This connection between the movable anvil and the clutch permits the anvil 25 to have an independent vertical movement without disturbing the position of the frame which carries the disks 36, and in this connection it is to be observed that the relative positions of the disks themselves is always constant, so that regardless of the extent to which they may be rotated by the up and down movement of the anvil 25 in adapting itself to nuts of varying lengths, the peripheries of the opposite disks 36 maintain the same relation. In order to hold the disk-carrying bearing frame 35 stationary while the anvil or head 25 is moving independently to adapt itself to the length of the nut, the same preferably has associated therewith the holding or retaining springs 43 respectively connected therewith and with the machine stand or frame and of sufficient tension to prevent the frame 35 and the disks 36 moving upwardly except when engaged by the locking detent 38. When at rest, the frame 35 is supported on suitable rest stops or abutments 44 on the machine stand or frame. (See Fig. 1).

The locking detent 38 is an element of the clutch which is carried by the impulse element referred to, and which impulse element is preferably in the form of an adjustable operating pitman 45. The impulse element may simply consist of a wedge-shaped or tapered pin having a pivotal mounting 46 on the upper end or head 46ª of the pitman 45 and a limited play on its pivot, so that it will adjust itself to any inequalities of the fitting of the parts and will always precisely center itself between and against the peripheries of the opposite clutching disks 36.

The pitman 45 is of sectional construction and provided with an adjusting turn buckle 47 connecting its sections so as to provide means whereby the extent or degree of the compressing movement imparted to the movable anvil through the compensating clutch may be adjusted to a nicety to suit the character of the pecan or other nut, according as the latter may be of the hard or thin shell variety. The said pitman 45 may be actuated from an operating crank 48 on a main drive shaft 49 journaled in suitable bearings 50 carried by the frame base or bed 9 and driven by an operating wheel 50ª mounted thereon, and in turn driven by power or hand according as the machine may be a power machine or a hand machine. In the form of construction illustrated, the main drive shaft 49 is utilized to transmit motion to the jack shafts 22, this being conveniently accomplished by means of chain connections 51 between sprocket wheels 52 and 53 applied respectively to the shafts 49 and 22.

Another feature of practical importance is in providing the proper feeding of the nuts one at a time into the compressing zone between the two anvils or members A and B, is that of the supply hopper 1 and the associated parts to insure the single feeding of the nuts into the feeding head 10. As already indicated, the hopper 1 is revoluble and is carried by the rotary supporting sleeve 2, and in the embodiment shown the said sleeve 2 is illustrated as being the hub of a horizontally arranged operating wheel 54, preferably of the beveled friction wheel type and adapted to be driven from a friction faced beveled wheel 55 and mounted on one of the jack shafts 22, the other jack shaft carrying a beveled idler 55ª arranged at the opposite side of the frame from the wheel 55 and engaging the wheel 54 to balance the mechanism.

Means are thus provided for imparting a constant rotation to the hopper with the consequence of keeping the nuts constantly shifting about, and in order to insure the feeding of the nuts lengthwise into the feeding head 10, the hopper has associated therewith an interior agitator having a gage ring 57 adapted to be horizontally vibrated over the central gravity discharge passage in the bottom of the hopper and provided with a plurality of upstanding agitator fingers 58 and inward projections 59 on said fingers. These elements when in motion serve to bring the nuts singly into a position whereby they will be caused to assume upright positions and pass lengthwise through the ring 57 into a removable guiding tube 60 which is removably inserted in the bottom discharge opening of the hopper and extend into the feeding head 10. The said guiding tube 60 is of a size to freely accommodate those nuts of reasonably varying diameters which are intended to be accommodated by the machine, and for different grades of nuts having other varying diameters, differently sized guiding tubes 60 may be readily inserted. This is a feature of practical importance by increasing the range of adjustment for the machine.

The horizontally vibrating agitator has connected therewith an operating arm 61 extending to a point outside of and beyond the hopper and carried by a vertically arranged oscillating supporting member 62 having a pivotal mounting as at 63 on a frame piece 64 and carrying a horizontal rigid dog 66 adapted to be engaged by ratchet projections 67 on the periphery of the operating wheel 54. A retracting spring 68 connected with said supporting member 62 normally holds the dog 66 yieldingly engaged with the ratchet periphery 67, so that as the wheel 54 rotates the agitating device within the hopper will be intermittently and sharply vibrated so as to compel the nuts to be promptly and positively fed lengthwise into the tube 60, and thence to the feeding head 10 where they are delivered one at a time through the agency of the automatic cut-off anvil A.

The cracked nuts are singly discharged or ejected to one side of the machine, immediately after the compression movement by means of an automatic ejecting device. This device may be constructed and operated in different ways, but a preferred and effective form of construction is shown in the accompanying drawings (see Fig. 10) and essentially consists of a swinging kicker frame 69 pivotally hung at its upper ends, as at 70, from the upper part of the machine frame 4 and normally retracted to an outward non-interfering position by means of suitable retracting springs 71 connected therewith and also with the machine frame. The swinging ends of the kicker frame 69 carry a contact 72 for engagement with the cracked nut without injuring the latter. To provide for the quick swinging movement of the kicker frame 69 across the vertical plane of the two compression members or anvils and between the latter, a toggle lever may be satisfactorily employed. This toggle lever, as shown, consists of the pivotally-connected lever members 73 and 74, which in turn are respectively pivoted to the anvil carrier 30 and to the side members of the kicker frame 69 contiguous to the pivotal support 70 therefor. Consequently, the straightening out of the toggle 73—74 by a lowering movement of the anvil carrier 30 provides means for sharply swinging the kicker frame against the cracked nut with the result of displacing the same from the supporting anvil B and into a side discharging chute 75 which directs the cracked nuts into a suitable receptacle.

In connection with the ejecting means, it is preferable to automatically clean away obstructing shell particles so that they will not interfere with the full and proper seating of the nut on the positioning or supporting anvil 25. One simple and practical means for accomplishing this result is to have the contact cushion 72 in the form of a brush which will not only provide a soft contact for the nut, but at the same time will sweep the upper surface of the movable anvil free of the shell particles. Another means whereby this may be accomplished is shown in Fig. 11 of the drawings, and consists of a blast nozzle 76 carried with the swinging contact end of the kicker frame and having a flexible tube connection 77 with the delivery pipe 78 of an air pump 79 suitably supported on the machine base, and having its piston rod (which in the type of pump shown is the delivery pipe) connected as at 80 with a bracket arm 81 carried by the head 46ª of the pitman 45. The air pump and its connections provide means for directing a blast of air downwardly through the nozzle 76 into the cavity or socket 26 of the anvil 25 when the swinging end of the kicker frame passes over the anvil.

Figure 4:
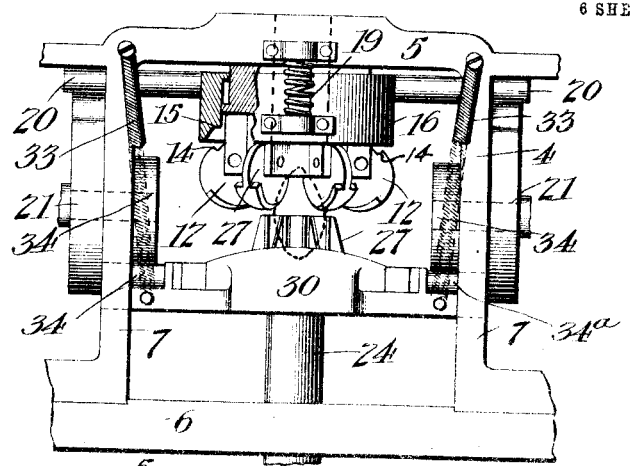

Referring briefly to the sequence of operations involved in the feeding, positioning, and cracking of the nuts, it has already been observed that the nuts are fed singly, with the assistance of the agitator within the hopper, from the latter through the guiding tube 60 and into the stationary feeding head 10 where the lowermost nut in the guiding tube is arrested by the group of abutment disks 12 when in their closed positions to constitute the bottom of the feeding head. In such position, the said lowermost nut is ready to be dropped past the automatic cut-off anvil onto the positioning and supporting anvil 25 and within the arms 27 of the centering holder associated therewith. To accomplish this, the controlling lifting cams 21 come into play by acting against the operating arms 20 of the reciprocal closing collar 16, thereby lifting the shoulders of said collar out of engagement with the eccentrically pivoted disks 12 which are thus permitted to swing by gravity to the open position shown in Fig. 4, leaving a clear space in the center through which a nut may drop onto the positioning and supporting anvil so that it will be held upright on the latter within the centering holder 27—27, it being observed that in this position of parts, the anvil head 25 lies within its guiding seat 29 so that the arms 27 engage the wall of the said seat and are held thereby in upright nut-holding or guarding position. When a single nut has been thus dropped between and past the abutment disk 12, the depressing cams 34 come into play and lower the anvil carrier 30 so that the upper end of the nut clears the disks 12 sufficiently to permit the latter to swing upwardly to their closed position, and thereby hold back the next succeeding nut and at the same time provide at the under side thereof a circular seat which receives the upper tapered end of the nut. When the anvil carrier 30 lowers sufficiently to permit a proper clearance for the disk 12, the lifting cams 21 will have turned to positions where the depressing springs 19 are permitted to come into play and rapidly depress the closing device or collar 16 so that the inner shoulders 15 thereof engage the shoulders 14 of the disks 12 and swing the same back to their closed positions shown in Fig. 5 of the drawings.

Upon the closing of the abutment disks, the depressing cams 34 ease off from the anvil carrier 30 so that the lifting springs 33 are permitted to lift the carrier and the anvil heads 25 therewith, with the result of bringing the nut solidly between the two members or anvils A and B (that is the anvil formed by the disks 12—12 and the anvil formed by the head 25). When the nut has been thus positioned and firmly caught between the two anvils, then, and then only, does the compression movement begin, it being understood that the upward final positioning movement of the carrier 30 with the anvil head 25 is permitted by the movable coupling connection between the lower movable anvil and the revoluble clutching disks, which with their carrier 35 might properly be termed a clutch shoe. This compression movement has already been explained and is provided for by the engagement of the locking detent 38 between and against the peripheries of the oppositely arranged disks 36. This engagement of the detent 38 with the disks 36 locks the said disks against movement, and hence locks the same to the yoke 39 carried with the lower anvil head 25, so that the lower anvil, the compensating clutch, and the impulse element or pitman 45 move together as a single element to the extent provided for by the adjustment of the turn-buckle 47. This movement is the compression movement which places the held nut under a limited endwise compression with the result of bursting or fracturing the shell about the middle. When this occurs, that is the compression movement, the lower anvil head 25 is moved independently of its carrier 30 thereby carrying the head 25 out of the seat 29, so that the retaining arms 27 are so released that they fall outwardly to give the nut perfect freedom for the swell of the bursted shell. Then, the depressing cams 34 again come into play and depress the anvil carrier 30, the lower anvil following the same under the pull of the holding springs 43 for the clutch shoe 35—36, and at the same time the toggle of the ejecting device is straightened out and thereby causes the kicker frame 69 to eject the cracked nut in the manner already explained. These various operations are rapidly repeated and in proper time or sequence, as will be readily understood.

From the foregoing, it will be understood that changes in the form, proportion, and minor details of construction may be resorted to without departing from the spirit or sacrificing any of the advantages of the invention, and, while the present invention has been more particularly described with reference to cracking nuts of the pecan type, it will be further understood that the novel cracking mechanism herein disclosed is applicable generally to the cracking of any form of edible nuts, such as Brazil nuts, English walnuts, and other shapes and forms of nuts that can be cracked to the best advantage by being always subjected to a compression impulse of relative constant extent regardless of their size.

I claim:

1. A nut cracking machine including a nut engaging compression member, and a compensating device comprising a self-adjusting connection with the compression member, and normally-disengaged reciprocal means having a frictional interlocking engagement with the self-adjusting connection, said reciprocal means having a relatively constant stroke.

2. A nut cracking machine including a nut engaging compression member, and a compensating device comprising a self-adjusting connection with the compression member, and normally-disengaged reciprocal means having a frictional interlocking engagement in a rectilinear path with the self-adjusting connection, said reciprocal means having a relatively constant stroke.

3. A nut cracking machine including a nut engaging compression member, and a compensating device comprising a self-adjusting connection with the compression member, and normally-disengaged reciprocal means having a frictional interlocking engagement of the self-adjusting connection and moving therewith in the same direction while interlocked, said reciprocal means having a relatively constant stroke.

4. A nut cracking machine including a nut engaging compression member, and a compensating device comprising a self-adjusting connection with the compression member, and normally-disengaged reciprocal means frictionally interlocking with the self adjusting connection to solidly connect and move the compensating device as a unit during its compression stroke.

5. A nut cracking machine including a nut engaging compression member, and a compensating device comprising normally disengaged parts, one part having a self-adjusting connection with the compression member, and the other part having a stroke of relatively constant extent and arranged to positively interlock with said other part and move therewith in the same direction while interlocked.

6. A nut cracking machine including oppositely arranged compression members having means for clamping a nut endwise therebetween, one of said members being automatically adjustable to nuts of varying lengths, and a normally disengaged reciprocal compensating device having separable frictional interlocking means for imparting to one of said members a compression impulse of relatively constant extent.

7. A nut cracking machine including a nut engaging compression member automatically adjustable to nuts of varying lengths, and an automatic clutch connecting with said compression member and comprising normally disengaged parts having a frictional interlocking engagement, and means for imparting to the parts when interlocked an impulse of relatively constant extent.

8. A nut cracking machine including a nut engaging compression member automatically adjustable to nuts of varying lengths, and an automatic clutch connecting with said compression member and comprising normally disengaged parts having a frictional interlocking engagement, and means for imparting to the parts when interlocked an impulse of relatively constant extent and in the same direction.

9. A nut cracking machine including oppositely arranged compression members, and a compensating device including a reciprocating impulse element, and an automatic clutch consisting of a reciprocal shoe member having an idle coupling or connection with one of the compression members, and a locking member carried by the impulse element and having a separable locking engagement with said shoe member to lock said idle connection.

10. A nut cracking machine including oppositely arranged compression members, and a compensating device including a reciprocating impulse element, and an automatic clutch consisting of a reciprocal spring-held shoe member having an idle connection with one of the compression members, and a locking member carried by the impulse element and having a separable locking engagement with said shoe member.

11. A nut cracking machine including oppositely arranged compression members, and a compensating device consisting of a reciprocating impulse element, a spring-restrained clutch shoe having an idle gear connection with one of the compression members, and a locking member carried by the impulse element for separable locking engagement with the clutch shoe to lock said idle gear connection.

12. A nut cracking machine including oppositely arranged compression members, and a compensating device consisting of a reciprocating longitudinally adjustable impulse element, a spring-restrained clutch shoe having an idle connection with one of the compression members, and a locking member carried by the impulse element for separable locking engagement with the elements of the shoe which provide said idle connection.

13. A nut cracking machine including oppositely arranged compression members, and a compensating device consisting of a reciprocating longitudinally adjustable operating pitman carrying a locking detent, and a spring-restrained clutch shoe having revoluble clutching disks frictionally engaged by the detent and having a normally idle gear connection with one of the compression members.

14. A nut cracking machine including oppositely arranged compression members, and a compensating device consisting of a reciprocal operating pitman carrying a locking detent, a coupling yoke carried with one of the compression members and having rack elements, and a spring-restrained clutch shoe carrying revoluble clutching disks geared with said rack element and engaged and locked by said locking detent.

15. A nut cracking machine including oppositely arranged compression members, and a compensating device consisting of a reciprocating longitudinally adjustable operating pitman carrying a locking detent, a coupling member carried with one of the compression members and having a rack, and a spring-restrained clutch shoe carrying a revoluble concentrically pivoted disk geared with said rack and adapted to be engaged and locked by said detent.

16. A nut cracking machine including oppositely arranged compression members, and a compensating device consisting of a reciprocal operating pitman carrying a locking detent, a spring-restrained clutch shoe carrying paired clutching disks eccentrically pivoted and having a normally idle coupling connection with one of the compression members, said disks being adapted to receive said detent in locking engagement therebetween.

17. In a machine of the class described, the combination with a compensating member to be operated at a constant impulse compensating device consisting of a reciprocal operating pitman carrying a locking detent, and a normally stationary clutch shoe carrying a pair of clutching disks arranged in edge to edge relation and each eccentrically pivoted, the said disks having a normally idle coupling connection with one of the compression members and arranged to receive said detent in wedging engagement therebetween.

18. A nut cracking machine including oppositely arranged compression anvils, one of which is automatically adaptable to the length of the nut and is provided with an adjustable head, and a compensating device including a reciprocating impulse element adjustable in length, and an automatic clutch having a normally idle coupling connection with the adjustable compression member and adapted to be engaged and locked at intervals by the impulse element.

19. A nut cracking machine including feed mechanism having an automatic segregator for feeding the nuts singly and adapted, in one position, to form a compression member, and compressing means.

20. A nut cracking machine including feed mechanism having a feeding head, and an automatic gate operating as a segregator for feeding the nuts singly, and means for subjecting a nut to compression against said segregator.

21. A nut cracking machine including feed mechanism having a feeding head, and an automatically movable gate carried by said head and operating as a segregator for feeding the nuts singly, said gate operating in its closed position as an anvil, and means for subjecting the nut to compression against said anvil.

22. A nut cracking machine including feed mechanism having a feeding head, an automatic segregator carried by said head and operating for feeding the nuts singly, means for positioning and supporting a nut directly against the segregator, and compensating means for giving a compression stroke of relative constant extent.

23. A nut cracking machine including feed mechanism having a feeding head, a plurality of automatically operated pivoted elements carried by said head and operating as a segregating device for feeding nuts singly, said elements being adapted to coöperate to form a cut-off anvil, and means for subjecting a nut to compression against said anvil.

24. A nut cracking machine including a feed mechanism having a cut-off device consisting of a circular group of radially arranged abutment disks, means for separating said disks to discharge a nut and for closing the same to form a cut-off and compression anvil, and means for subjecting a nut to compression against said anvil.

25. A nut cracking machine including a feed mechanism having a cut-off device consisting of a plurality of movable elements, means for moving said elements to an open position for discharging a nut and for carrying them to a closed position to form a cut-off and a compression anvil, and means for subjecting a nut to compression against said anvil.

26. A nut cracking machine including a feed mechanism having a cut-off device consisting of a plurality of eccentrically pivoted abutment disks, means for causing said disks to respectively swing to positions permitting the discharge of a nut and to positions forming a cut-off and compression anvil, and means for subjecting a nut to compression against said anvil.

27. A nut cracking machine including a feed mechanism having a cut-off device consisting of a circular group of radially disposed eccentrically pivoted disks, means for causing said disks to swing to open and closed positions, and means for subjecting a nut to compression against said disks.

28. A nut cracking machine including a feed mechanism having a cut-off device consisting of a plurality of eccentrically pivoted abutment disks forming a rigid compression member for the machine, cam controlled means having a member engaging said disks to turn the same in one direction, and means for subjecting a nut to compression against said disks.

29. A nut cracking machine including a feed mechanism having a cut-off device consisting of a plurality of eccentrically pivoted disks, a reciprocal closing collar having an engagement with said disks to turn the same to a position in which they form a cut-off and a rigid compression anvil, cam devices operatively connected with said collar, and means for subjecting a nut to compression against said anvil.

30. A nut cracking machine including a feed mechanism having a hopper, a stationary feeding head in communication with the hopper, a cut-off device consisting of a plurality of eccentrically pivoted disks mounted in said head, automatically operating means for causing said disks to turn to open and closed positions, and means for subjecting a nut to compression against said disks when closed.

31. A nut cracking machine including a feed mechanism having a hopper, a stationary feeding head, and an automatic cut-off device carried by said head, a removable combined guiding and gaging tube fitting in the passage opening between the hopper and said feeding head, and suitable compression means.

32. A nut cracking machine including a feed mechanism having a hopper, a feeding head in communication therewith, and a removable combined guiding and gaging tube fitting in the passage opening between the hopper and said head, and nut cracking means.

33. A nut cracking machine including a feed mechanism having a revoluble hopper, a vibrating agitator operating within the hopper, means for simultaneously rotating the hopper and communicating a vibrating motion to the agitator, and a shell cracking mechanism.

34. A nut cracking machine including a frame having a bearing, an operating wheel journaled on said bearing, a hopper carried by said wheel, a vibrating agitator operating within the hopper and actuated from said wheel, driving means for the said wheel, and shell cracking mechanism.

35. A nut cracking machine including a frame having a bearing, an operating wheel journaled on said bearing and having peripheral ratchet projections, a hopper carried by said wheel, and an agitating device including a member operating within the hopper and also having an exterior pivotally mounted oscillating support carrying a rigid dog yieldingly engaging said ratchet projections, and a shell cracking mechanism.

36. In a nut cracking machine, the combination with a shell cracking mechanism, of a feed mechanism having a hopper and an agitator therein, said agitator being provided with a horizontally vibrating ring having upstanding agitator fingers and projections on the latter, and means for actuating said agitator.

37. A nut cracking machine including a relatively stationary anvil, a movable supporting anvil, a mechanically controlled rising and falling anvil carrier for the movable anvil, and a compensating device having means for imparting a compression impulse to the movable anvil independently of said carrier.

38. A nut cracking machine including a relatively stationary anvil, a vertically movable anvil carrier, a movable supporting anvil slidably suspended by the anvil carrier, means for causing the said carrier to successively lower and raise in positioning and clamping the nut between the two anvils, and a compensating device having means for imparting an independent compression impulse to the movable anvil.

39. A nut cracking machine including a relatively stationary anvil, a vertically movable anvil carrier, a movable supporting anvil carried by the anvil carrier, an ejecting device, means for causing the carrier to successively lower and raise in positioning and clamping the nut between the two anvils and then to lower to an extreme position to free a cracked nut to the ejector, means for imparting an independent compression impulse to the movable anvil, and ejector operating means.

40. A nut cracking machine including a relatively stationary anvil, a vertically movable anvil carrier, a movable supporting anvil carried by the anvil carrier and having an automatic nut centering holder, means for operating the carrier, and means for imparting an independent compression impulse to the movable anvil.

41. A nut cracking machine including a relatively stationary anvil, a movable supporting anvil, an automatic nut centering holder disposed above the movable anvil, means for opening and closing the holder, means for imparting a compression impulse to the movable anvil, and ejecting means.

42. A nut cracking machine including a relatively stationary anvil, a vertically movable anvil carrier, a movable supporting anvil carrying a plurality of upstanding pivotal retaining arms adapted to be closed and opened by respectively engaging and being freed from the anvil carrier, means for operating the carrier, means for imparting an independent compression impulse to the movable anvil, and ejecting means operating when said retaining arms are open.

43. A nut cracking machine including a relatively stationary anvil, a vertically movable anvil carrier, a movable supporting anvil carried by said carrier, means for causing the carrier to respectively lower and raise in positioning and clamping the nut between the two anvils, and then to lower to an extreme position with the nut when cracked, means for imparting a compression impulse to the movable anvil, an ejecting device, and ejector operating means operatively actuated by the anvil carrier when it moves to said extreme position with a cracked nut.

44. A nut cracking machine including a relatively stationary anvil, a vertically movable anvil carrier, a supporting anvil carried by said carrier, means for operating the carrier, means for imparting a compression impulse to the anvil, and an ejecting device consisting of a swinging spring-retracted kicker frame, and a toggle lever connection between said frame and the anvil carrier.

45. A nut cracking machine including oppositely arranged anvils, a movable carrier for one of the anvils, means for independently operating the carrier, means for causing a relative compression movement between the two anvils, and an ejecting device having operating connections with the anvil carrier.

46. A nut cracking machine including a shell cracking mechanism, an ejecting device, and a mechanical cleaning device having means for clearing away shell particles from the shell cracking mechanism, and means for operating said cleaning device.

47. A nut cracking machine including a shell cracking mechanism, and an automatically operating cleaning device having means for clearing away shell particles therefrom.

54. A nut cracking machine including a shell cracking mechanism, an ejecting device, and a cleaning device carried by the ejecting device.

55. A nut cracking machine including a shell cracking mechanism, and an ejecting device carrying a cleaning brush.

56. A nut cracking machine including a shell cracking mechanism, and an ejecting device having a swinging kicker frame carrying a cleaning brush.

In testimony whereof I hereunto affix my signature in the presence of two witnesses.

DICK B. WILLIAMS.

Witnesses:
EMORY L. GROFF,
JAMES H. MARR.